No. 639,295. Patented Dec. 19, 1899.
R. F. ROBISON.
DRIVING MECHANISM FOR BICYCLES.
(Application filed Aug. 19, 1897.)
(No Model.)
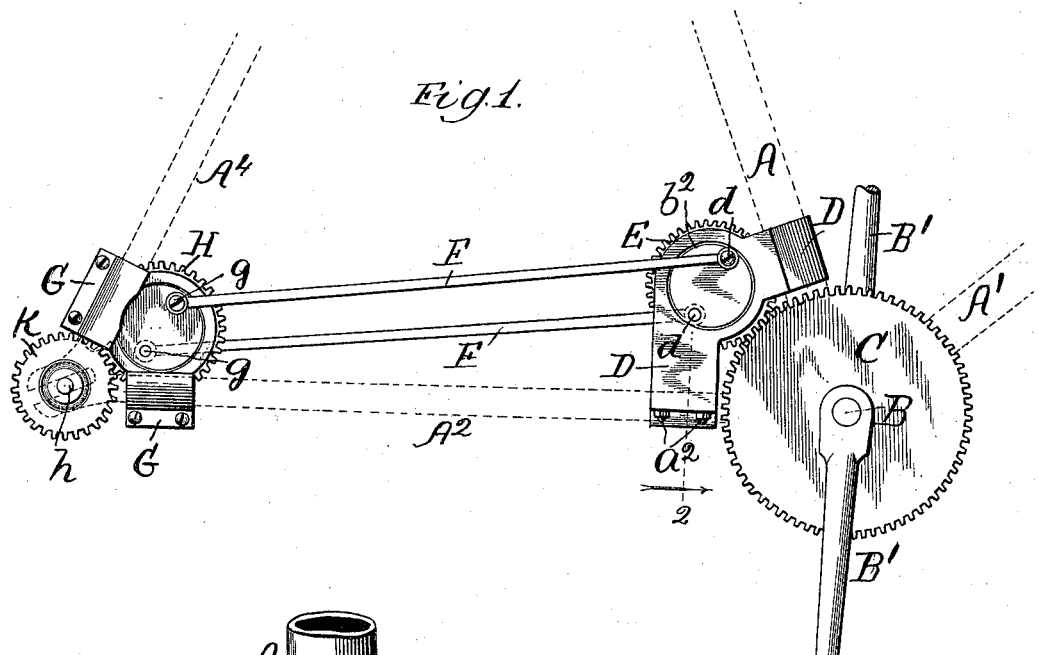
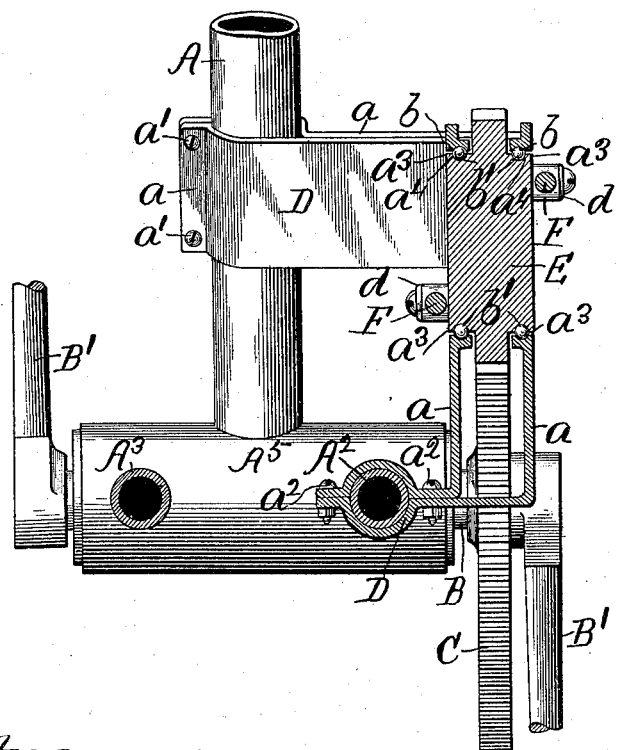
Witnesses:
Chas. E. Gaylord,
Lute S. Alter.
Inventor:
R. F. Robison.
By L. B. Coupland & Co
Attys.

UNITED STATES PATENT OFFICE.

ROBERT F. ROBISON, OF CHICAGO, ILLINOIS.

DRIVING MECHANISM FOR BICYCLES.

SPECIFICATION forming part of Letters Patent No. 639,295, dated December 19, 1899.

Application filed August 19, 1897. Serial No. 648,772. (No model.)

*To all whom it may concern:*

Be it known that I, ROBERT F. ROBISON, a citizen of the United States, residing at Chicago, in the county of Cook and State of Illinois, have invented certain new and useful Improvements in Driving Mechanism for Bicycles; and I do hereby declare the following to be a full, clear, and exact description of the invention, such as will enable others skilled in the art to which it appertains to make and use the same.

This invention relates to improvements in driving mechanism for bicycles and similar vehicles, and has for its object to provide an arrangement of this character that will dispense with and take the place of the ordinary sprocket-chain.

In the drawings, Figure 1 is a side elevation embodying the improved features, the relative position of the frame parts being indicated in dotted lines; and Fig. 2, a broken-away part elevation and part section on line 2, Fig. 1, looking in the direction indicated by the arrow.

A represents the center stay member of the frame of a bicycle; A', the lower main tube; $A^2 A^3$, the back forks; $A^4$, the backstays; $A^5$, the hanger; B, the crank-axle, and B' B' the crank-arms mounted on the respective ends thereof.

A gear-wheel C is rigidly mounted on the crank-axle adjacent to one end and on the inner side of the crank-arm, as shown in Fig. 2. The upper end of an angular bracket D is clamped to the center stay member of the frame and from that point extends outwardly and then downwardly, the lower terminal end extending inwardly at right angles and being clamped on one of the back-fork members $A^2$. This bracket will consist, ordinarily, of two companion parts $a\ a$, bent into the required shape, the upper ends of which encircle the center stay A and are locked in place by bolts $a'$, while the lower ends, embracing a member of the back forks, are locked together by the bolts $a^2$. The two parts comprising the bracket D are spread apart at a point between the respective ends to form a seat for the gear-wheel E, mounted therein. The toothed periphery of the gear-wheel E projects beyond the edges of the bracket parts and engages with the gear-wheel C, mounted on the crank-axle. The gear-wheel E is cut away, Fig. 2, on each side of the projecting toothed periphery to form the annular shoulder-bearings $a^3\ a^3$, which are provided with grooves $a^4$. The adjacent annular edges of the bracket parts are provided with grooves $b$, which are in line with the corresponding grooves in the gear-wheel E. These grooves are filled with balls $b'$ and provide a ball-bearing for the wheel E. The bearing-balls are inserted in place through a suitable opening provided in the inclosing bracket. The two bracket parts $a\ a$ are provided with openings $b^2$ at each side of the gear-wheel E. The companion bearing-pins $d\ d$ are inserted in the respective sides of the wheel E and are set diametrically opposite each other, so as to ease and facilitate the rotary action, making the movement more positive and dispensing with the "dead-points." The front ends of the companion connecting or driving rods F F are connected to the pins $d\ d$.

The upper end of a second angular bracket G is clamped to one of the back-stay tubes $A^4$ and the lower end clamped to one of the back-fork tubes $A^2$, bringing the same in line with the bracket D. The outer side of the bracket G is broken away to show a second gear-wheel H, which is provided with a ball-bearing in bracket G. These parts are exact duplicates of the companion bracket D and gear-wheel E, so that the detail description of one answers for both. The gear-wheel H is provided on each side with bearing-pins $g\ g$, set at opposite points, and have the rear ends of the driving-rods F F connected thereto. The gear-wheel H engages with gear-wheel K, mounted on the axle $h$ of the rear driving-wheel. This arrangement provides a simple, positive, and convenient driving connection between the crank-axle and the rear-wheel axle of a bicycle and possesses advantages over that of other devices for a similar purpose.

Having thus described my invention, what I claim as new, and desire to secure by Letters Patent, is—

1. In driving mechanism for bicycles the combination with, the crank-axle, of a gear-wheel mounted thereon, the two-part angular bracket, having its upper and lower ends secured to the center stay member of the frame and the back fork respectively, the gear-wheel mounted in said bracket, the two parts of which are spread apart at a point between the respective ends to form a seat for the gear-wheel mounted thereon and engaging with the gear-wheel on the crank-shaft, the rear wheel and its axle, and the companion connecting-rods, for transmitting the required motion thereto, substantially as described.

2. In driving mechanism for bicycles, the combination with the crank-axle, of a gear-wheel, mounted thereon, a two-part angular bracket, having its upper and lower ends secured to the center stay member and back fork of the frame, the gear-wheel, seated in said bracket and engaging with the gear-wheel on the crank-shaft and being cut away on each side of its toothed periphery to form shoulder-bearings in which are formed annular grooves, the said bracket being provided interiorly with corresponding grooves, and the bearing-balls, inserted therein, substantially as described.

3. In driving mechanism for bicycles, the combination with the crank-shaft, of a gear-wheel mounted thereon, a two-part angular bracket, provided interiorly with annular grooves, the center stay member of the frame and the back fork, to which the respective upper and lower ends of said bracket parts are clamped, the gear-wheel, seated in said bracket and provided on each side of its toothed periphery with annular grooves corresponding to the grooves in said bracket, the bearing-balls, inserted in said grooves, the companion bracket, the backstay and back fork, to which the respective ends of the companion bracket are secured, the gear-wheel, seated in said companion bracket, the rear axle, the gear-wheel, mounted thereon, and the driving-rods, connecting the two gear-wheels, seated in the companion brackets, substantially as described.

In testimony whereof I affix my signature in presence of two witnesses.

ROBERT F. ROBISON.

Witnesses:
L. M. FREEMAN,
L. B. COUPLAND.